United States Patent
Yoshida et al.

(10) Patent No.: US 8,340,518 B2
(45) Date of Patent: Dec. 25, 2012

(54) PON SYSTEM, STATION-SIDE APPARATUS FOR PON SYSTEM, AND CONTROL METHOD THEREOF

(75) Inventors: Hiroaki Yoshida, Kanagawa (JP); Tetsuya Yokomoto, Kanagawa (JP); Hiroji Shigetome, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 252 days.

(21) Appl. No.: 12/677,258

(22) PCT Filed: May 28, 2009

(86) PCT No.: PCT/JP2009/002351
§ 371 (c)(1),
(2), (4) Date: Mar. 9, 2010

(87) PCT Pub. No.: WO2010/137073
PCT Pub. Date: Dec. 2, 2010

(65) Prior Publication Data
US 2011/0217041 A1 Sep. 8, 2011

(51) Int. Cl.
*H04J 14/00* (2006.01)
(52) U.S. Cl. .............. 398/70; 398/71; 398/72
(58) Field of Classification Search ............ 398/25, 398/36, 34, 58, 66–72, 74, 75, 165
See application file for complete search history.

(56) References Cited

U.S. PATENT DOCUMENTS

| | | | |
|---|---|---|---|
| 6,813,277 B2 * | 11/2004 | Edmon et al. | 370/442 |
| 7,639,949 B2 * | 12/2009 | Jung et al. | 398/98 |
| 8,005,020 B2 * | 8/2011 | Karschnia | 370/255 |
| 2005/0158048 A1 * | 7/2005 | Sung et al. | 398/66 |
| 2009/0162065 A1 * | 6/2009 | Mizutani et al. | 398/66 |

FOREIGN PATENT DOCUMENTS

| | | |
|---|---|---|
| JP | 02-095034 A | 4/1990 |
| JP | 07-288497 A | 10/1995 |
| JP | 2002-033757 A | 1/2002 |
| JP | 2002-064524 | 2/2002 |
| JP | 2002-064524 A | 2/2002 |
| JP | 2002-152228 | 5/2002 |
| JP | 2002-152228 A | 5/2002 |
| JP | 2007-049376 A | 2/2007 |

(Continued)

OTHER PUBLICATIONS

Yoshihara, Shinichi, Suzuki, Kenichi, Saito, Kouichi, "Proposed Multi-rate Scheduling Method in G-PON DBA," Proceedings of the IEICE General Conference, 2004, Japan, The Institute of Electronics, Information and Communication Engineers, Mar. 8, 2004, communication 2, B-8-13, pp. 346-346.

(Continued)

*Primary Examiner* — Dalzid Singh
(74) *Attorney, Agent, or Firm* — Ladas & Parry, LLP (57) ABSTRACT

An OLT, which is one of the embodiments of the present invention, is provided with: an allocation request receiving unit that receives a bandwidth allocation request from each of 1G-ONUs and each of 10G-ONUs; an allocation execution unit that allocates to each of the ONUs a time slot for data transmission in accordance with an allocation rule based on fairness in time allocation or an allocation rule based on fairness in throughput allocation; and an allocation result notification unit that notifies each of the ONUs of information regarding the time slot.

7 Claims, 8 Drawing Sheets

FOREIGN PATENT DOCUMENTS

| | | |
|---|---|---|
| JP | 2007-243770 | 9/2007 |
| JP | 2007-243770 A | 9/2007 |
| JP | 2008-270898 | 11/2008 |
| JP | 2008-270898 A | 11/2008 |
| JP | 2009-010687 A | 1/2009 |
| WO | WO 2008055438 A1 * | 5/2008 |

OTHER PUBLICATIONS

IPRP for corresponding PCT/JP2009/002351 dated Dec. 12, 2011; along with its English translation.

* cited by examiner

| ONU-ID | ONU TYPE | UNI INPUT RATE |
|---|---|---|
| #1 | 1G | 100 |
| #2 | 1G | 1000 |
| #3 | 1G | 100 |
| #4 | 1G | 1000 |
| #5 | 10G | 1000 |
| #6 | 10G | 1000 |
| #7 | 10G | 100 |
| #8 | 10G | 1000 |

| ONU -ID | ONU TYPE | UNI INPUT RATE | UPSTREAM-DIRECTION PON-INTERVAL OUTPUT RATE | | EQUAL-TRANSMISSION-AMOUNT ALLOCATION RULE |
|---|---|---|---|---|---|
| | | | ISOCHRONOUS ALLOCATION RULE | | |
| | | | BEFORE RECALCULATION | AFTER RECALCULATION | |
| #1 | 1G | 1000 | 125 | 128.5 | 140.8 |
| #2 | 1G | 1000 | 125 | 128.5 | 140.8 |
| #3 | 1G | 1000 | 125 | 128.5 | 140.8 |
| #4 | 1G | 1000 | 125 | 128.5 | 140.8 |
| #5 | 1G | 1000 | 125 | 128.5 | 140.8 |
| #6 | 1G | 1000 | 125 | 128.5 | 140.8 |
| #7 | 1G | 1000 | 125 | 128.5 | 140.8 |
| #8 | 10G | 1000 | 1250 | 1000 | 140.8 |

FIG.7

| ONU-ID | ONU TYPE | UNI INPUT RATE | UPSTREAM-DIRECTION PON-INTERVAL OUTPUT RATE | | EQUAL-TRANSMISSION-AMOUNT ALLOCATION RULE |
|---|---|---|---|---|---|
| | | | ISOCHRONOUS ALLOCATION RULE | | |
| | | | BEFORE RECALCULATION | AFTER RECALCULATION | |
| #1 | 1G | 1000 | 125 | 150 | 227.2 |
| #2 | 1G | 1000 | 125 | 150 | 227.2 |
| #3 | 1G | 1000 | 125 | 150 | 227.2 |
| #4 | 1G | 1000 | 125 | 150 | 227.2 |
| #5 | 10G | 1000 | 1250 | 1000 | 227.2 |
| #6 | 10G | 1000 | 1250 | 1000 | 227.2 |
| #7 | 10G | 1000 | 1250 | 1000 | 227.2 |
| #8 | 10G | 1000 | 1250 | 1000 | 227.2 |

FIG.8

| ONU -ID | ONU TYPE | UNI INPUT RATE | UPSTREAM-DIRECTION PON-INTERVAL OUTPUT RATE | | EQUAL-TRANSMISSION-AMOUNT ALLOCATION RULE |
|---|---|---|---|---|---|
| | | | ISOCHRONOUS ALLOCATION RULE | | |
| | | | BEFORE RECALCULATION | AFTER RECALCULATION | |
| #1 | 1G | 1000 | 125 | 300 | 588.2 |
| #2 | 10G | 1000 | 1250 | 1000 | 588.2 |
| #3 | 10G | 1000 | 1250 | 1000 | 588.2 |
| #4 | 10G | 1000 | 1250 | 1000 | 588.2 |
| #5 | 10G | 1000 | 1250 | 1000 | 588.2 |
| #6 | 10G | 1000 | 1250 | 1000 | 588.2 |
| #7 | 10G | 1000 | 1250 | 1000 | 588.2 |
| #8 | 10G | 1000 | 1250 | 1000 | 588.2 |

PON SYSTEM, STATION-SIDE APPARATUS FOR PON SYSTEM, AND CONTROL METHOD THEREOF

CROSS-REFERENCE TO RELATED APPLICATIONS

This application is the U.S. National Stage of International Patent Application No. PCT/JP2009/002351, filed on May 28, 2009, the disclosure of which is hereby incorporated by reference in its entirety.

TECHNICAL FIELD

The present invention relates to data communication technology and particularly to a PON (Passive Optical Network) system, a station-side apparatus for the PON system, and a control method thereof.

BACKGROUND ART

Currently, an embodiment of an optical access network in which data is transmitted by an optical fiber in an access line area includes a PON type network. Due to the increase in the speed of data transmission in the access line area, a PON system that realizes a communication speed of 1 Gbps such as a GE-PON (Gigabit Ethernet (registered trademark)-Passive Optical Network), etc., has become widely used.

[Patent document 1] Japanese Patent Application Laid-open 2009-10687

DISCLOSURE OF INVENTION

Problem to be Solved by the Invention

As shown in FIG. 10 of the above patent document 1, when transmitting data, in a PON system, from multiple ONUs (Optical Network Units) installed in subscribers' homes to an OLT (Optical Line Terminal) installed in a communication carrier, each of the ONUs transmits data requesting the OLT a bandwidth for data transmission (hereinafter, arbitrarily referred to as a "bandwidth allocation request"). The OLT, upon the receipt of the bandwidth allocation request, allocates, to each ONU, a time slot allowing for data to be transmitted from the ONU. Transmitting data during the time slot allocated to each ONU allows for the data transmission from the multiple ONUs to be conducted in a time-multiplexed manner.

It is believed that there will be a further increase in the speed of the data transmission in the access line area in the future. During this course, both an ONU that is adaptable only for a relatively low communication speed and an ONU that is adaptable also for a relatively high communication speed are considered to be connected to the same OLT. In this background, the inventor considers that fairness in the bandwidth allocation for each of the multiple ONUs with different maximum communication speeds is required of the OLT. However, such an idea of performing bandwidth allocation fairly on multiple kinds of ONUs or the method thereof has not been sufficiently suggested.

In this background, a main purpose of the present invention is to provide a technique for achieving bandwidth allocation in a PON system based on the perspective of fairness for multiple ONUs with different maximum communication speeds.

Means to Solve the Problem

A station-side apparatus in the PON system according to one embodiment of the present invention comprises: an allocation request receiving unit operative to receive, from each of a plurality of home-side apparatuses, each adaptable for different maximum communication speeds, a bandwidth allocation request for data transmission in the upstream direction; an allocation execution unit operative to allocate, to each of the plurality of home-side apparatuses, a time slot of the same length for transmitting data from the home-side apparatus in a time-multiplexed manner; and an allocation result notification unit operative to notify each of the home-side apparatuses of information regarding an allocated time slot.

The "maximum communication speed" of a home-side apparatus may be the maximum communication speed of communication within a PON interval, which is the interval between the home-side apparatus and the station-side apparatus. The "time slot" may be a period that allows for data to be transmitted to a specific home-side apparatus within a predetermined period, and different time slots are typically allocated to different home-side apparatuses. The "information regarding an allocated time slot" may specify the starting time of data transmission and the amount of the data transmission, the starting time of data transmission and the period at which the data transmission is allowed, or the starting time of data transmission and the ending time of the data transmission.

According to the present embodiment, time for transmitting data in the upstream direction can be allocated, in an equitable manner, to each of multiple home-side apparatuses with different maximum communication speeds, and each of the home-side apparatuses can thus transmit data in the upstream direction during the same time interval. In other words, fairness can be ensured with regard to time allocation when allowing each home-side apparatus to transmit data in the upstream direction.

Another embodiment of the present invention relates to a station-side apparatus in a PON system. The apparatus is a station-side apparatus in the PON system and comprises: an allocation request receiving unit operative to receive, from each of a plurality of home-side apparatuses, each adaptable for different maximum communication speeds, a bandwidth allocation request for data transmission in the upstream direction; an allocation execution unit operative to allocate, to each of the plurality of home-side apparatuses, a time slot for transmitting data from the home-side apparatus in a time-multiplexed manner, whose length is determined in accordance with the maximum communication speed of each of the home-side apparatuses so that the amount of data transmitted from each of the home-side apparatuses in a predetermined unit time becomes the same; and an allocation result notification unit operative to notify each of the home-side apparatuses of information regarding an allocated time slot.

The "predetermined unit time" may be a period that includes a period used for the allocation of time slots to the respective home-side apparatuses or a grant cycle, i.e., a bandwidth allocation cycle. The condition where the "length is determined in accordance with the maximum communication speed" may be defined to be the condition where the length is determined to be shorter as the maximum communication speed becomes higher and where the length is determined to be longer as the maximum communication speed becomes lower. In other words, the length may be determined so as to inversely correlate with the maximum communication speed.

According to the present embodiment, the amount of data to be transmitted in the upstream direction in a unit time is allocated, in an equitable manner, to each of multiple home-side apparatuses with different maximum communication speeds, and each of the home-side apparatuses can thus transmit the same amount of data in the upstream direction. In other words, fairness can be ensured with regard to throughput allocation when allowing each home-side apparatus to transmit data in the upstream direction.

Still another embodiment of the present invention relates to a station-side apparatus in a PON system. The apparatus is a station-side apparatus in the PON system and comprises: an allocation request receiving unit operative to receive, from each of a plurality of home-side apparatuses, each adaptable for different maximum communication speeds, a bandwidth allocation request for data transmission in the upstream direction; an allocation execution unit operative to allocate, to each of the plurality of home-side apparatuses, a time slot for transmitting data from the home-side apparatus in a time-multiplexed manner, whose length is determined in accordance with any one of a plurality of types of allocation rules; an allocation result notification unit operative to notify each of the home-side apparatuses of information regarding an allocated time slot; and an allocation rule switching unit operative to switch a current allocation rule to another allocation rule when a predetermined switching condition is satisfied. The plurality of types of allocation rules includes a first allocation rule by which a time slot of the same length is allocated to each of the home-side apparatuses and a second allocation rule by which a time slot, whose length is determined in accordance with the maximum communication speed of each of the home-side apparatuses so that the amount of data transmitted from each of the home-side apparatuses in a predetermined unit time becomes the same, is allocated to each of the home-side apparatuses.

The "predetermined switching condition" is a predetermined condition for switching among the allocation rules. For example, the predetermined switching condition may be a condition related to the configuration embodiment of a PON system or a condition related to the attribute information on or the operation status of multiple home-side apparatuses. The predetermined switching condition may also be the detection of a switching instruction from a predetermined operator such as the operator of a communication carrier in which the station-side apparatus is installed.

According to the present embodiment, when a switching condition is satisfied, the allocation rule including the first allocation rule based on the fairness in time allocation and the second allocation rule based on the fairness in throughput allocation can be switched from the current allocation rule to another allocation rule. In other words, an allocation rule can be flexibly switched in accordance with various changes in the state of a PON system. For example, the first allocation rule and the second allocation rule can be appropriately switched between each other.

The allocation rule switching unit may switch an allocation rule to be observed by the allocation execution unit between the first allocation rule and the second allocation rule in accordance with the ratio of the home-side apparatuses that are adaptable for a maximum communication speed of at least a predetermined value to the plurality of home-side apparatuses.

The condition where "in accordance with a ratio" may be defined to be the condition where the ratio becomes at least a predetermined threshold or less than the threshold. According to the embodiment, in accordance with a change in the ratio of the home-side apparatuses that are also adaptable for relatively high communication speeds in the PON system, one can appropriately switch between ensuring the fairness in time allocation and ensuring the fairness in throughput allocation.

The allocation rule switching unit may switch an allocation rule to be observed by the allocation execution unit from the second allocation rule to the first allocation rule when the ratio of the plurality of home-side apparatuses that are adaptable for a maximum communication speed of at least a predetermined value becomes at least a predetermined value. The condition where "the ratio . . . becomes at least a predetermined value" may be defined to be the condition where the ratio is at least 80 percent to 90 percent.

According to the embodiment, when the ratio of the home-side apparatuses that are also adaptable for relatively high communication speeds in the PON system becomes larger, one switches from ensuring the fairness in throughput allocation to ensuring the fairness in time allocation. This allows for a policy of bandwidth allocation to be changed so as to effectively use the performance of high-speed home-side apparatuses when a certain ratio of low-speed home-side apparatuses are replaced with high-speed home-side apparatuses, allowing for an improved level of user-friendliness for the subscribers having high-speed home-side apparatuses.

The allocation rule switching unit may switch an allocation rule to be observed by the allocation execution unit from the first allocation rule to the second allocation rule when the ratio of the plurality of home-side apparatuses that are adaptable for a maximum communication speed of at least a predetermined value becomes less than a predetermined value. The condition "the ratio . . . becomes less than a predetermined value" may be defined to be when the ratio is less than 80 percent to 90 percent.

According to the embodiment, when the ratio of the home-side apparatuses that are also adaptable for relatively high communication speeds in the PON system becomes smaller, one switches from ensuring the fairness in time allocation to ensuring the fairness in throughput allocation. This allows for a policy of bandwidth allocation to be changed so as to ensure communication bandwidths for low-speed home-side apparatuses when high-speed home-side apparatuses are cut off from the PON system due to power discontinuity, etc., i.e., when the ratio of low-speed home-side apparatuses increases, allowing for an improved level of user-friendliness for the subscribers having low-speed home-side apparatuses.

The station-side apparatus may be further provided with a home-side information storage unit that stores the maximum communication speed at a UNI in a subscriber's home in which each of the plurality of home-side apparatuses is installed. The allocation execution unit may redistribute, when the communication speed of a home-side apparatus that is estimated by a time slot allocated to the home-side apparatus exceeds the maximum communication speed at the UNI, a part of the time slot allocated to the home-side apparatus to another home-side apparatus.

The "maximum communication speed at the UNI" may be the maximum communication speed between circuit-terminating equipment such as an ONU and a subscriber's terminal in a subscriber's home, for example, the maximum communication speed at a connector part of a UTP cable that is connected to the circuit-terminating equipment. The "the communication speed of a home-side apparatus that is estimated by a time slot" may be a communication speed that is calculated based on a time-slot length and the maximum communication speed of a home-side apparatus, in other words, an effective communication speed.

The condition of redistributing "a part of the time slot allocated to the home-side apparatus to another home-side apparatus" may be defined to be the condition where the time slots to be allocated to each of the home-side apparatuses are recalculated before each of the home-side apparatuses is notified of information regarding the time slots that have been once allocated to the respective home-side apparatuses so that the substantially remaining time slots due to the restriction of the UNI are distributed to other home-side apparatuses. More specifically, the lengths of the time slots of other terminal-side apparatuses may be extended by distributing the remaining portion of the time slots that corresponds to the size of the amount that exceeds the maximum communication speed at the UNI. In other words, the lengths of the time slots to be reallocated to other home-side apparatuses may be the total amount of the lengths of the time slots that have been once allocated and the resulting lengths of the time slots after the remaining portion of the time slots are distributed. The remaining portion of the time slots may be distributed in accordance with the number of home-side apparatuses. For example, the remaining portion may be evenly distributed to multiple other home-side apparatuses.

According to the embodiment, the remaining portion of the time slots generated due to the upper limit of the communication speed that can be substantially provided to the subscribers is reallocated to other home-side apparatuses. This allows for the improvement of the communication speed of the home-side apparatuses to which the remaining portion is redistributed by efficiently using the portion of the time slots, in other words, the bandwidths that will be otherwise wasted. In other words, the level of user-friendliness of the subscribers having the home-side apparatuses to which the remaining portion is redistributed can be improved without lowering user-friendliness of the subscribers having the home-side apparatuses from which the remaining portion is redistributed.

Still another embodiment of the present invention relates to a control method of a station-side apparatus in a PON system. This is a control method of a station-side apparatus in a PON system and comprises: receiving, from each of a plurality of home-side apparatuses, each adaptable for different maximum communication speeds, a bandwidth allocation request for data transmission in the upstream direction; allocating, to each of the plurality of home-side apparatuses, a time slot for transmitting data from the home-side apparatus in a time-multiplexed manner, whose length is determined in accordance with any one of a plurality of types of allocation rules; notifying each of home-side apparatuses of information regarding an allocated time slot; and switching a current allocation rule to another allocation rule when a predetermined switching condition is satisfied; wherein the plurality of types of allocation rules includes a first allocation rule by which a time slot of the same length is allocated to each of the home-side apparatuses and a second allocation rule by which a time slot, whose length is determined in accordance with the maximum communication speed of each of the home-side apparatuses so that the amount of data transmitted from each of the home-side apparatuses in a predetermined unit time becomes the same, is allocated to each of the home-side apparatuses.

Still another embodiment of the present invention relates to a PON system. In the PON system, a plurality of home-side apparatuses, each adaptable for different maximum communication speeds, and a station-side apparatus are connected to each other, and the station-side apparatus comprises: an allocation request receiving unit operative to receive, from each of the plurality of home-side apparatuses, a bandwidth allocation request for data transmission in the upstream direction; an allocation execution unit operative to allocate, to each of the plurality of home-side apparatuses, a time slot for transmitting data from the home-side apparatus in a time-multiplexed manner, whose length is determined in accordance with any one of a plurality of types of allocation rules; an allocation result notification unit operative to notify each of the home-side apparatuses of information regarding an allocated time slot; and an allocation rule switching unit operative to switch a current allocation rule to another allocation rule when a predetermined switching condition is satisfied. The plurality of types of allocation rules includes a first allocation rule by which a time slot of the same length is allocated to each of the home-side apparatuses and a second allocation rule by which a time slot, whose length is determined in accordance with the maximum communication speed of each of the home-side apparatuses so that the amount of data transmitted from each of the home-side apparatuses in a predetermined unit time becomes the same, is allocated to each of the home-side apparatuses.

Optional combinations of the aforementioned constituent elements, or implementations of the invention in the form of apparatuses, methods, systems, programs, and recording mediums storing programs may also be practiced as additional modes of the present invention.

Advantageous Effects

According to the present invention, bandwidth allocation can be achieved in a PON system based on the perspective of fairness for multiple ONUs with different maximum communication speeds.

BEST MODE FOR CARRYING OUT THE INVENTION

Figure 1:
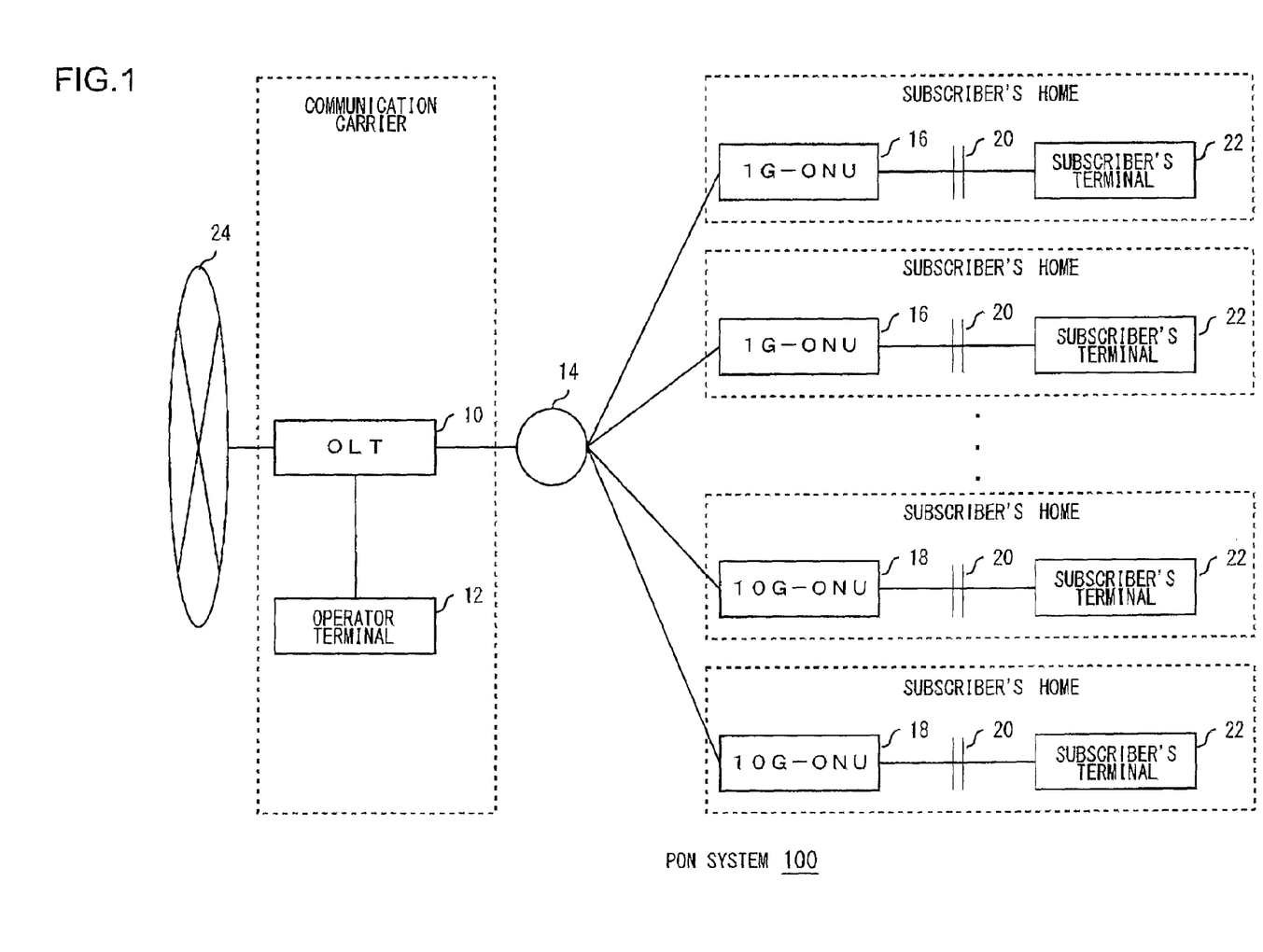
FIG. 1 is a diagram illustrating the configuration of a PON system according to an embodiment of the present invention.

FIG. 1 illustrates the configuration of a PON system according to an embodiment of the present invention. In a PON system 100, an OLT 10 is a station-side apparatus installed in a communication carrier and is adaptable for both the bit rates of 1 Gbps and 10 Gbps. The OLT 10 is connected to both an operator terminal 12, which is a common PC terminal operated by an operator of the communication carrier, and an upper network 24 such as a WAN or the Internet. The OLT 10 is connected via an optical coupler 14 to a 1 G-ONU 16 and a 10 G-ONU 18 that are-installed in the subscribers' homes.

The 1 G-ONU 16 is a home-side apparatus with a maximum communication speed of 1 Gbps in both the upstream and downstream directions. The 10 G-ONU 18 is a home-side apparatus with a maximum communication speed of 10 Gbps in both the upstream and downstream directions. The 1 G-ONU 16 and the 10 G-ONU 18 are connected via a UNI (User-Network Interface) 20, which functions as the interface for the user equipment, to a subscriber's terminal 22, which is a common PC terminal. The function of a UNI may be implemented inside each ONU. Hereinafter, the expression "ONU" represents both the 1 G-ONU 16 and the 10 G-ONU 18.

In a PON system 100, the 1 G-ONUs 16 and the 10 G-ONUs 18 are connected to the optical coupler 14 by respective optical fibers for respective subscribers. The OLT 10 and the optical coupler 14 are connected by a single optical fiber shared by multiple subscribers. Upon the receipt, from each ONU, of a bandwidth allocation request, more specifically, a request for allocating a time slot during which data can be transmitted, the OLT 10 carries out dynamic bandwidth allocation in accordance with an allocation algorithm (hereinafter, arbitrary referred to as an "allocation rule") that gives consideration to the fairness among multiple ONUs. More specifically, the OLT 10 allocates a time slot allowing data transmission, in other words, an available bandwidth, to an ONU, which is a source of the bandwidth allocation request.

Figure 2:
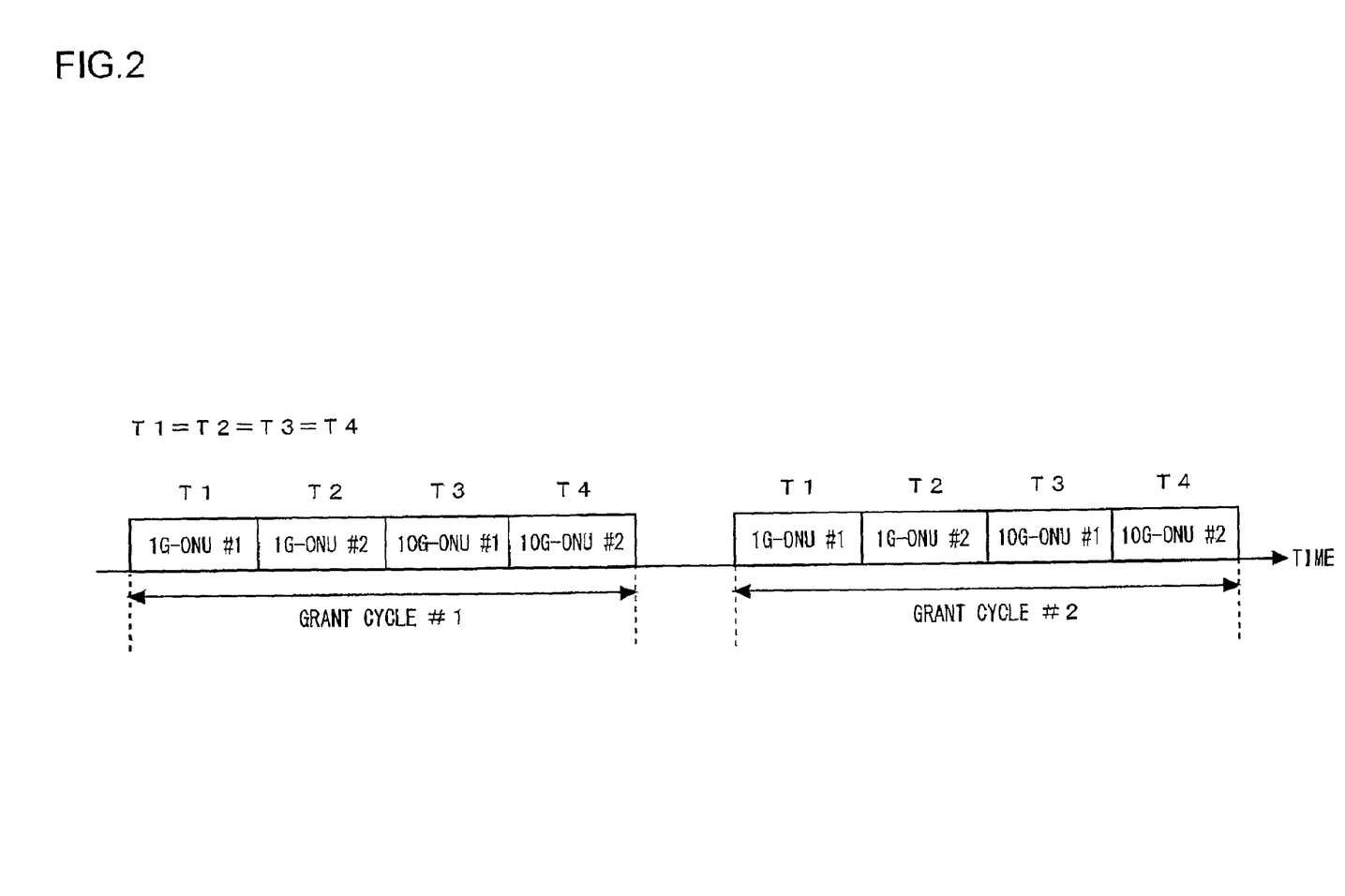
FIG. 2 is a diagram illustrating an example of an allocation rule.

FIG. 2 illustrates an example of an allocation rule. The figure shows time slots allocated to respective ONUs when an allocation rule ensuring fairness with regard to time allocation (hereinafter, arbitrarily referred to as an "isochronous allocation rule") during the allocation of a time slot to each of the multiple ONUs. In the figure, T1-T4 represent time-slot lengths allocated to respective ONUs. In the figure, grant cycles represent bandwidth allocation cycles for time slots to be allocated to respective ONUs. In other words, time slots are allocated to respective ONUs for each grant cycle. When in compliance with the isochronous allocation rule, the OLT 10 allocates time slots of the same length to the respective ONUs regardless of the maximum communication speed thereof.

Figure 3:
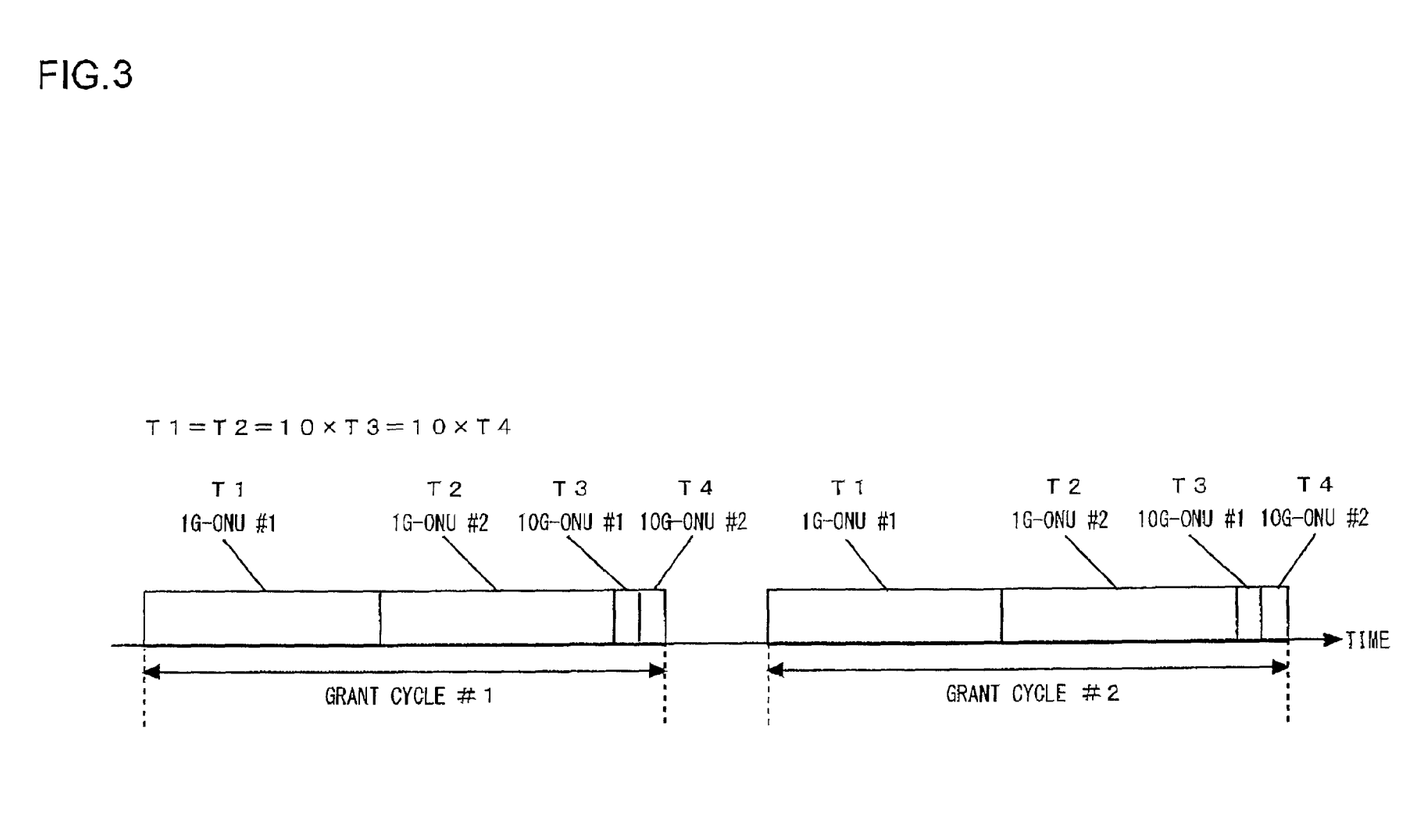
FIG. 3 is a diagram illustrating another example of an allocation rule.

FIG. 3 illustrates another example of the allocation rule. The figure shows time slots allocated to respective ONUs when an allocation rule ensuring fairness with regard to throughput allocation (hereinafter, arbitrarily referred to as an "equal-transmission-amount allocation rule") during the allocation of a time slot to each of the multiple ONUs. In the figure, T1-T4 also represent time-slot lengths allocated to respective ONUs. The maximum communication speed of the 1 G-ONU is one-tenth of the maximum communication speed of the 10 G-ONU. Thus, the time-slot length allocated to the 1 G-ONU (T1 and T2) is set to be ten times that of the time-slot length allocated to the 10 G-ONU (T3 and T4). More specifically, in compliance with the equal-transmission-amount allocation rule, the OLT 10 allocates, to respective ONUs, time slots of lengths that inversely correlate with the maximum communication speed of the respective ONUs so that the amount of data transmitted from the respective ONUs in the grant cycles equals out.

The OLT 10 transmits the information regarding the time slots allocated to the respective ONUS (hereinafter, also referred to as a "grant notification," arbitrarily) to the respective ONUs. In accordance with the grant notification, the ONUs transmit to the OLT 10 transmission data for an upper network 24 during the respective time slots allocated to the ONUs. As a response to the grant notification, each ONU transmits to the OLT 10 a bandwidth allocation request including information regarding the amount of data requested to be transmitted to the OLT 10. In between a given grant cycle and the subsequent grant cycle, the OLT 10 performs a dynamic bandwidth allocation process based on the bandwidth allocation requests that have been received up to that point.

Figure 4:
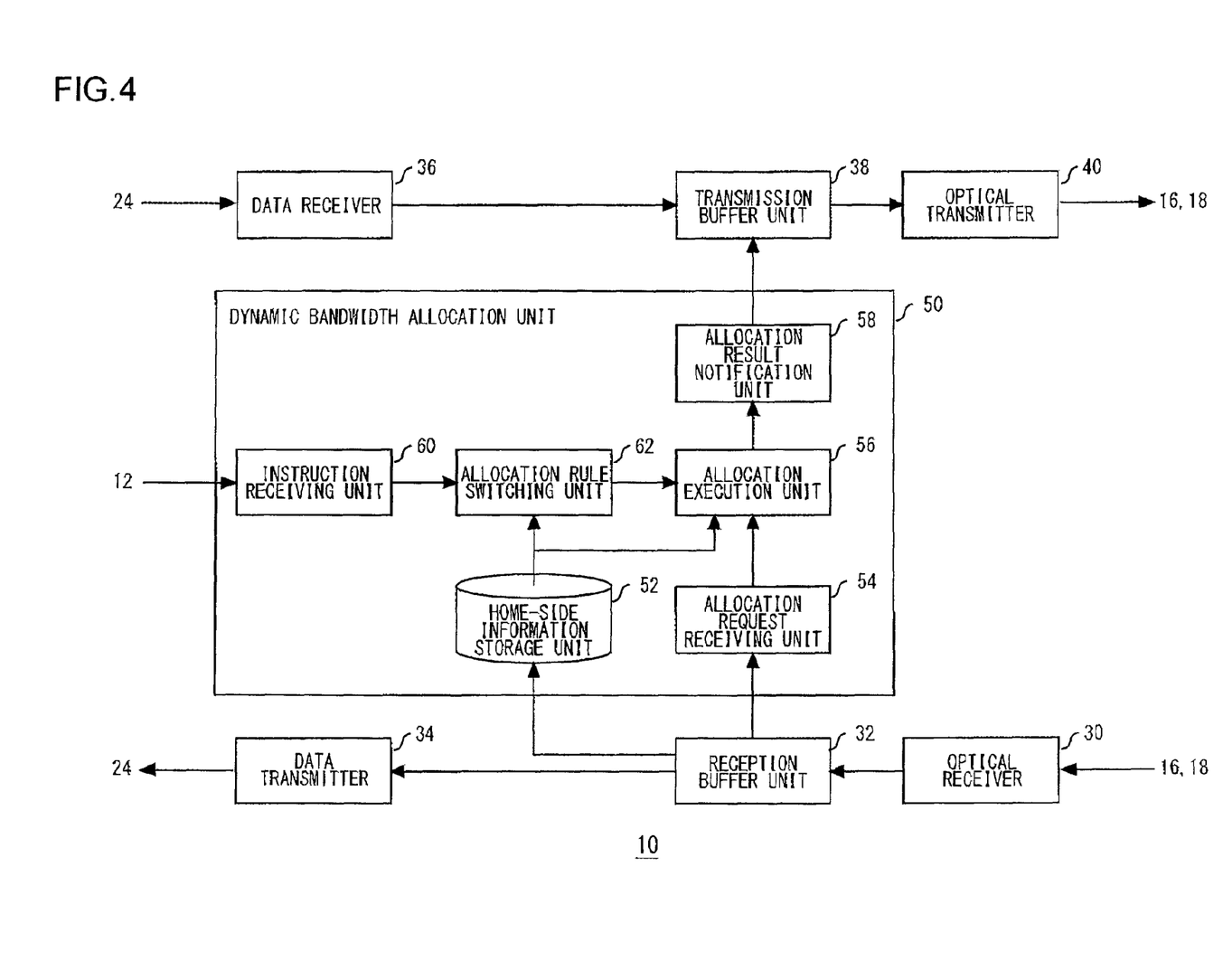
FIG. 4 is a block diagram illustrating a functional configuration of an OLT in FIG. 1.

FIG. 4 is a block diagram illustrating a functional configuration of the OLT 10 in FIG. 1. The figure mainly illustrates functional blocks according to the dynamic bandwidth allocation in the present embodiment. The OLT 10 may obviously be further provided with functional blocks that provide other functions such as priority control. The blocks shown in the block diagrams of the present specification are implemented in the hardware by any CPU of a computer, other elements, or mechanical devices, and in software by a computer program or the like. FIG. 2 depicts functional blocks implemented by the cooperation of hardware and software. Thus, a person skilled in the art should appreciate that there are many ways of accomplishing these functional blocks in various forms in accordance with the components of the combination of hardware and software.

The OLT 10 is provided with an optical receiver 30, a reception buffer unit 32, a data transmitter 34, a data receiver 36, a transmission buffer unit 38, an optical transmitter 40, and a dynamic bandwidth allocation unit 50.

The optical receiver 30 receives an optical signal transmitted from the 1 G-ONU 16 and the 10 G-ONU 18 and performs an optical and electrical conversion. The reception buffer unit 32 temporarily stores data after the optical and electrical conversion.

The data that is temporarily stored in the reception buffer unit 32 includes data to be transmitted to the upper network 24 (hereinafter, arbitrarily referred to as "upstream data"), data for notifying the status of an apparatus installed in a subscriber's home (hereinafter, arbitrarily referred to as "home-side status data"), and data for the bandwidth allocation request. The upstream data is the data transmitted to the upper network 24 by the subscriber's terminal 22. The home-side status data includes the maximum communication speed of the ONU and the maximum communication speed of the UNI 20 associated with the ONU. The home-side status data may be acquired at the time of the auto-negotiation between the OLT 10 and each ONU, may be included in the bandwidth allocation request, and may be periodically transmitted from each ONU.

The data transmitter 34 acquires the upstream data temporarily stored in the reception buffer unit 32 and transmits the upstream data to the upper network 24 side. The data receiver 36 receives the data in the downstream direction (hereinafter, arbitrarily referred to as "downstream data") that has been transmitted from the upper network 24 side to the subscriber's terminal 22.

The transmission buffer unit 38 temporarily stores the received downstream data. The transmission buffer unit 38 also temporarily stores the data, which is passed from the dynamic bandwidth allocation unit 50, for notifying of the time slots allocated to respective ONUs. The optical transmitter 40 acquires the downstream data temporarily stored in the transmission buffer unit 38 and then performs an electrical and optical conversion so as to transmit an optical signal corresponding to the downstream data to the 1 G-ONU 16 and the 10 G-ONU 18. Similarly, the optical transmitter 40 transmits the notification data of the time slots to respective ONUs.

The dynamic bandwidth allocation unit 50 performs dynamic bandwidth allocation on each ONU in accordance with the allocation rule defined to ensure fairness among the multiple ONUs. The dynamic bandwidth allocation unit 50 has a home-side information storage unit 52, an allocation request receiving unit 54, an allocation execution unit 56, an allocation result notification unit 58, an instruction receiving unit 60, and an allocation rule switching unit 62.

The home-side information storage unit 52 acquires the home-side status data that is temporarily stored in the reception buffer unit 32 and stores the home-side status data in a home-side information table, which is a predetermined memory area. In other words, the home-side status data for an ONU that is currently connected to the OLT 10 is recorded in the home-side information table.

Figure 5:
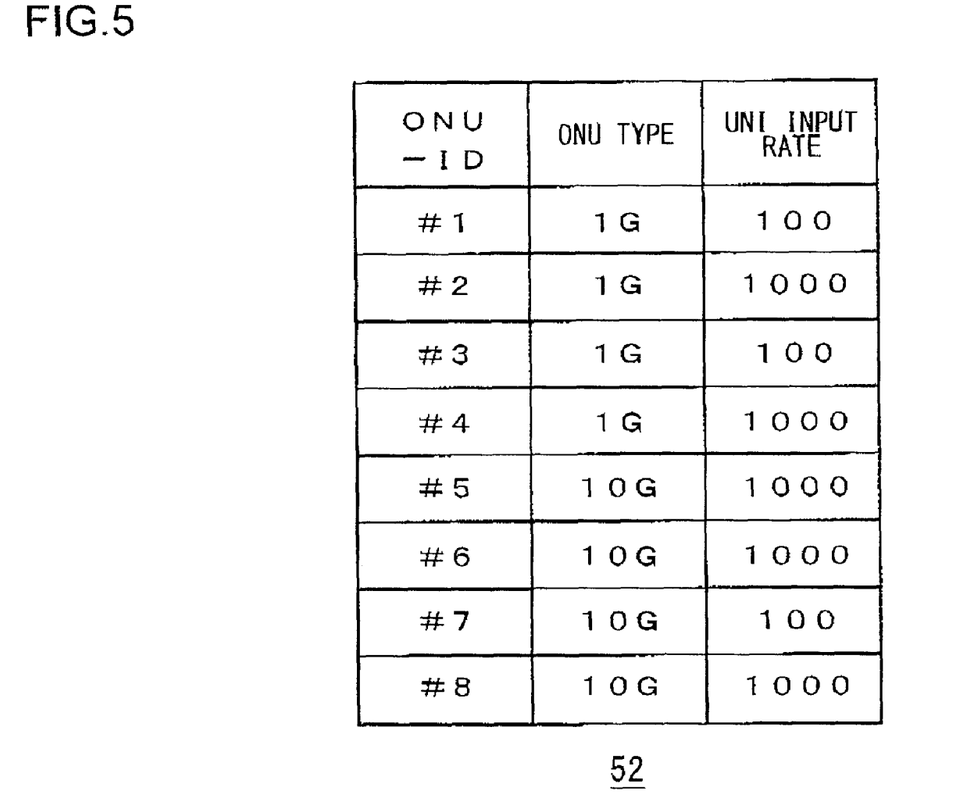
FIG. 5 is a diagram illustrating the configuration of a home-side information table.

FIG. 5 illustrates the configuration of the home-side information table. The identification information of the ONUS in the PON system 100 is recorded in an ONU-ID column in the figure. For example, the identification information may be a logical link identifier (LLID) that is defined in IEEE 802.3, a MAC address, a VLAN-ID that is defined in IEEE 802.1Q, or a unique identifier for ONU authentication. Alternatively, the identification information may be a combination of several kinds of identification information. The maximum communication speed for which each of the ONUs is adaptable is recorded in an ONU-type column. In a UNI-input rate column, the maximum communication speed in a UNI 20 in association with each of the ONUs, in other words, the bit rate between the subscriber's terminal and the UNI 20, is recorded. FIG. 4 is referred back.

The allocation request receiving unit 54 acquires the data of a bandwidth allocation request, which is temporarily stored in the reception buffer unit 32, and passes the data to the allocation execution unit 56. The allocation execution unit 56 performs a dynamic bandwidth allocation process in accordance with the bandwidth allocation request. More specifically, the allocation execution unit 56 allocates a time slot to the ONU, which is the source of the bandwidth request, in accordance with the isochronous allocation rule or the equal-transmission-amount allocation rule. In the present embodiment, the combination of the transmission starting time at which the transmission of an optical signal is allowed and the transmission-permitted time is allocated as a time slot. As an exemplary variation, the combination of the transmission starting time and the amount of data transmitted or the combination of the transmission starting time and the transmission ending time may be allocated.

A detailed description will now be made regarding the dynamic bandwidth allocation process of the allocation execution unit 56 in response to multiple bandwidth allocation requests. When in compliance with the isochronous allocation rule, the allocation execution unit 56 allocates, as many times as the number of received bandwidth allocation requests, multiple time slots having the same lengths to the respective ONUs. The length of the time slots to be allocated to the respective ONUs may be determined in advance based on, for example, the maximum number of connections or the average number of connections of the 1 G-ONU 16 and the 10 G-ONU 18 with respect to the OLT 10, and the proper length needs to be determined based on the knowledge of an operator or the experiments conducted in the PON system 100.

On the other hand, when in compliance with the equal-transmission-amount allocation rule, the allocation execution unit 56 allocates time slots, whose lengths are set so that the amounts of data transmitted in a unit time from the respective ONUs become equal to one another, to the respective ONUs in accordance with the maximum communication speed of the ONUS, which are sources of the bandwidth allocation requests, in reference to the home-side information table. For example, the allocation execution unit 56 allocates to the 1 G-ONU 16 a time slot whose length is ten times more than that of the time slot to be allocated to the 10 G-ONU 18. In this case, the proper time-slot length may also be determined in advance in the same way described above. Regardless of which allocation rule is to be applied, the total of the lengths of the time slots allocated to the respective ONUs becomes the length of a grant cycle.

After once determining time slots to be allocated to the respective ONUs, the allocation execution unit 56 estimates, based on the lengths of the time slots, the effective communication speed of the data transmission from the respective ONUs to the OLT 10 before the respective ONUs are notified of the information of the time slots. For example, if the length of the time slot allocated to the 10 G-ONU 18 is one-eighth of the grant cycle, the communication speed of the 10 G-ONU 18 is estimated to be 1250 Mbps. The allocation execution unit 56 determines whether or not the effective communication speed estimated for the respective ONUs exceeds UNI input rates corresponding to the respective ONUs, in reference to the home-side information table. If the effective communication speed of an ONU exceeds the UNI input rate that corresponds to the ONU, the allocation execution unit 56 recalculates the time slots to be allocated to the ONUs so that the remaining portion of the time slot that corresponds to the exceeding amount is redistributed to other ONUs. In the present embodiment, the allocation execution unit 56 equally distributes the remaining portion of the time slot to other ONUs. An example of the recalculation of a time slot will be described later.

The allocation result notification unit 58 passes to the transmission buffer unit 38 the information regarding the time slots that have been allocated to the respective ONUS by the allocation execution unit 56. In this manner, the information regarding the time slots is notified to the 1 G-ONU 16 and the 10 G-ONU 18 via the optical transmitter 40.

The instruction receiving unit 60 receives, from the operator terminal 12, the data of a switching instruction for switching the allocation rule of the time slots. The allocation rule switching unit 62 switches the allocation rule to which the allocation execution unit 56 conforms between the isochronous allocation rule and the equal-transmission-amount allocation rule in accordance with the switching instruction from the operator terminal 12.

In reference to the home-side information table, the allocation rule switching unit 62 autonomously switches the allocation rule between the isochronous allocation rule and the equal-transmission-amount allocation rule in accordance with the ratio of the multiple ONUs that account for the 10 G-ONUs 18 in the PON system 100 (hereinafter, arbitrarily referred to as "10 G-ONU occupancy"). The allocation rule switching unit 62 may calculate the 10 G-ONU occupancy every time the home-side information table is updated and may switch the allocation rule as needed by following the change in the occupancy. The allocation rule switching unit 62 may calculate the 10 G-ONU occupancy on a regular basis and switch the allocation rule on a regular basis.

For example, in the initial state of the OLT 10, the allocation execution unit 56 allocates time slots in compliance with the equal-transmission-amount allocation rule, and the allocation rule switching unit 62 monitors the value of the 10 G-ONU occupancy by referring, on a regular basis, to the home-side information table. Upon the detection of the 10 G-ONU occupancy becoming 80 percent or more, the allocation rule switching unit 62 switches the allocation rule to which the allocation execution unit 56 conforms to the isochronous allocation rule. For example, upon the detection of the 10 G-ONU occupancy becoming less than 80 percent, the allocation rule switching unit 62 switches the allocation rule to which the allocation execution unit 56 conforms from the isochronous allocation rule to the equal-transmission-amount allocation rule.

The allocation rule switching unit 62 gives priority to the switching based on the switching instruction acquired via the instruction receiving unit 60 over autonomous switching based on the allocation rule. For example, when switching, based on a switching instruction, the allocation rule back to the equal-transmission-amount allocation rule after autonomously switching the allocation rule from the equal-transmission-amount allocation rule to the isochronous allocation rule, the allocation rule switching unit 62 does not again autonomously switch the allocation rule to the isochronous allocation rule. Similarly, the allocation rule switching unit 62 also prioritizes the switching instruction after the switching from the isochronous allocation rule to the equal-transmission-amount allocation rule.

The explanation is given of the operation of the above configuration in the following. Upon the receipt of the upstream data for the upper network 24 from the subscriber's terminal 22, the 1 G-ONU 16 and the 10 G-ONU 18 transmit bandwidth allocation requests to the OLT 10. The allocation request receiving unit 54 of the OLT 10 receives bandwidth allocation requests from multiple ONUs. Upon the receipt of the bandwidth allocation requests, the allocation execution unit 56 allocates time slots allowing the upstream data to transmit to the respective ONUs in accordance with either the isochronous allocation rule or the equal-transmission-amount allocation rule. In this case, when there is a remaining portion of the time slot allocated to an ONU due to the restriction of the UNI 20, the allocation execution unit 56 recalculates the time slots to be allocated to other ONUs so that the remaining portion of the time slot is redistributed to the ONUs. The allocation result notification unit 58 notifies the respective ONUs of the information regarding the allocated time slots. Transmitting respective optical signals by the 1 G-ONU 16 and the 10 G-ONU 18 to the OLT 10 during the time slots that are allocated to the 1 G-ONU 16 and the 10 G-ONU 18, respectively, allows for optical signals from multiple ONUs to be transmitted to the OLT 10 in a time-division manner and for the upstream data to be transferred to the upper network 24.

Upon the detection of the 10 G-ONU occupancy in the PON system 100 reaching at least a predetermined value, the allocation rule switching unit 62 autonomously switches the allocation rule for the OLT 10 from the equal-transmission-amount allocation rule to the isochronous allocation rule. Upon the detection of the 10 G-ONU occupancy going below the predetermined value, the allocation rule switching unit 62 autonomously switches the allocation rule for the OLT 10 from the isochronous allocation rule to the equal-transmission-amount allocation rule. Upon the receipt of the switching instruction of the allocation rule, the allocation rule switching unit 62 gives priority to the switching instruction over the autonomous switching and switches the allocation rule for the OLT 10 from the isochronous allocation rule to the equal-transmission-amount allocation rule or from the equal-transmission-amount allocation rule to the isochronous allocation rule.

Figure 6:
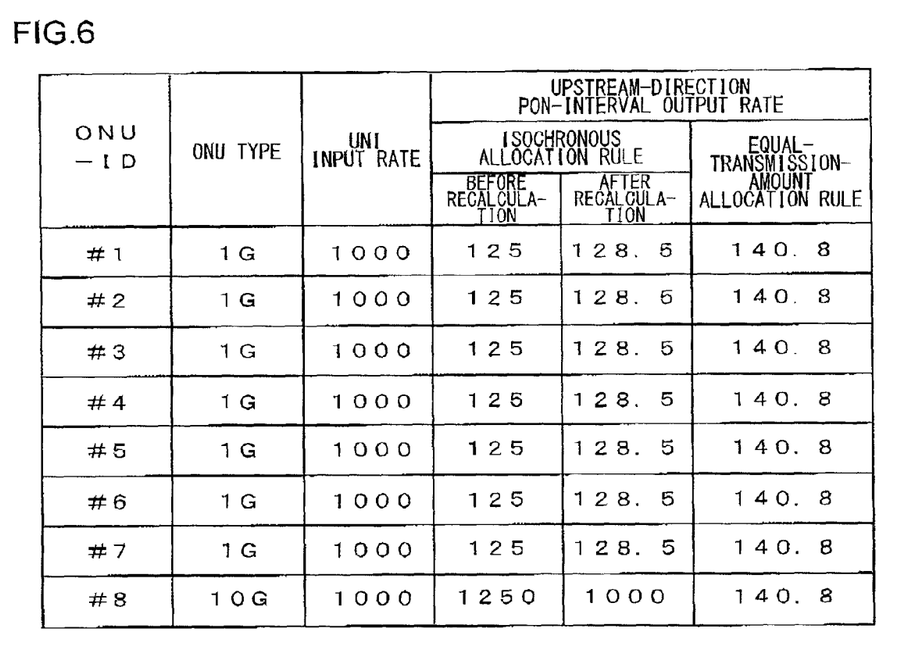
FIG. 6 is a diagram illustrating a first example of an upstream PON-interval output rate of an ONU.

FIG. 6 illustrates a first example of the upstream output rates of the ONUs in a PON interval (hereinafter, arbitrarily referred to as the "upstream PON-interval output rate"). This example shows the upstream PON-interval output rate when the number of 1 G-ONUs 16 is much greater than the number of 10 G-ONUs 18 in the PON system 100. The upstream PON-interval output rate shows the effective communication speed of the data transmission to the OLT 10 from the respective 1 G-ONUs 16 and from the respective 10 G-ONUs 18, and the value is determined by both the maximum communication speed of the respective ONUs and the lengths of the respective time slots that have been allocated by the OLT 10. In other words, the larger the maximum communication speed of an ONU becomes and the longer the length of its time slot becomes, the larger the upstream PON-interval output rate becomes. To simplify the explanation, the intervals between the grant cycles that are treated as overhead are not taken into consideration in the calculation of the upstream PON-interval output rates shown in FIGS. 6-8.

When the isochronous allocation rule is applied, the time slots whose lengths are one-eighth of that of the grant cycle are allocated to all the ONUs, if no reallocation of the time slots occurs. Thus, the upstream PON-interval output rate of the 1 G-ONUs 16 becomes 125 Mbps, and the upstream PON-interval output rate of the 10 G-ONUs 18 becomes 1250 Mbps. In the case that the reallocation of the time slots is carried out, the following procedure is further performed. In other words, due to the limitation of the UNI input rate, 20 percent of the time slots allocated to the 10 G-ONUs 18 is surplus, and this remaining portion is equally distributed to each of the 1 G-ONUs 16. As a result, one-280th of the length of the grant cycle is additionally allocated to the time slots of the respective 1 G-ONUs 16. Thus, the upstream PON-interval output rate of the 1 G-ONUs 16 becomes 128.5 Mbps, and the upstream PON-interval output rate of the 10 G-ONUs 18 becomes 1000 Mbps.

When the equal-transmission-amount allocation rule is applied, the lengths of the time slots of the 1 G-ONUs 16 are set to be ten times longer than the lengths of the time slots of the 10 G-ONUs 18. Thus, time slots accounting for ten seventy-oneths ($10/71$) of the length of the grant cycle are allocated to the respective 1 G-ONUS 16, and time slots accounting for one seventy-oneth ($1/71$) of the length of the grant cycle are allocated to the respective 10 G-ONUs 18. As a result, both the upstream PON-interval output rate of the 1 G-ONUs 16 and the upstream PON-interval output rate of the 10 G-ONUs 18 become 140.8 Mbps.

Figure 7:
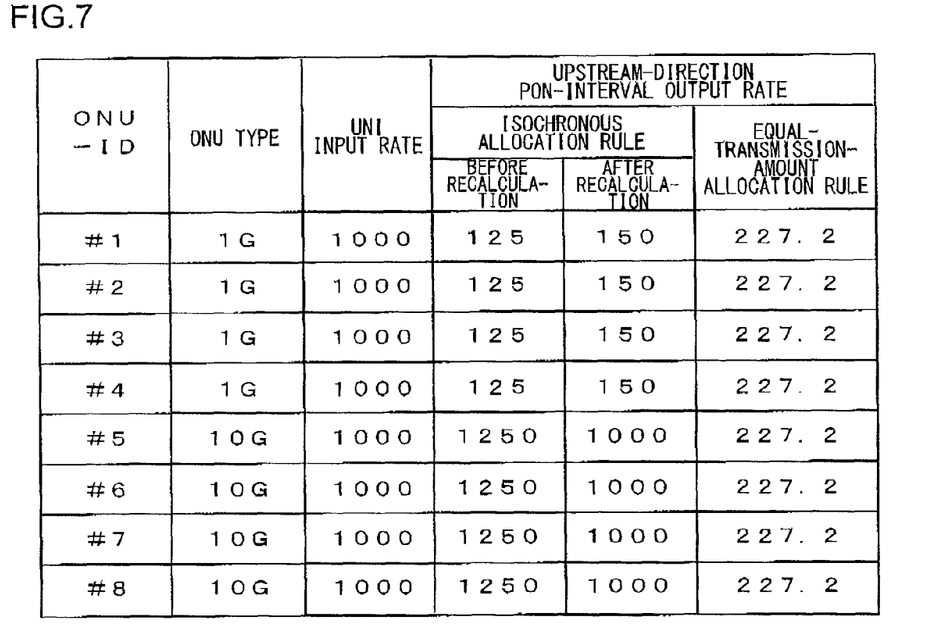
FIG. 7 is a diagram illustrating a second example of an upstream PON-interval output rate of an ONU.

FIG. 7 illustrates a second example of the upstream PON-interval output rates of the ONUS. This example shows the upstream PON-interval output rate when the number of 1 G-ONUs 16 is the number of 10 G-ONUs 18 in the PON system 100. The same as in the first example applies to the upstream PON-interval output rates, if no reallocation of the time slots occurs, when the isochronous allocation rule is applied. In the case the reallocation of the time slots is carried out, one fortieth ($1/40$) of the length of the grant cycle is additionally allocated to the time slots of the respective 1 G-ONUs 16. Thus, the upstream PON-interval output rates of the 1 G-ONUs 16 becomes larger than that of the first example. When the equal-transmission-amount allocation rule is applied, time slots accounting for ten fourty-fourths ($10/44$) of the length of the grant cycle are allocated to the respective 1 G-ONUs 16, and time slots accounting for one fourty-fourth ($1/44$) of the length of the grant cycle are allocated to the respective 10 G-ONUs 18.

Figure 8:
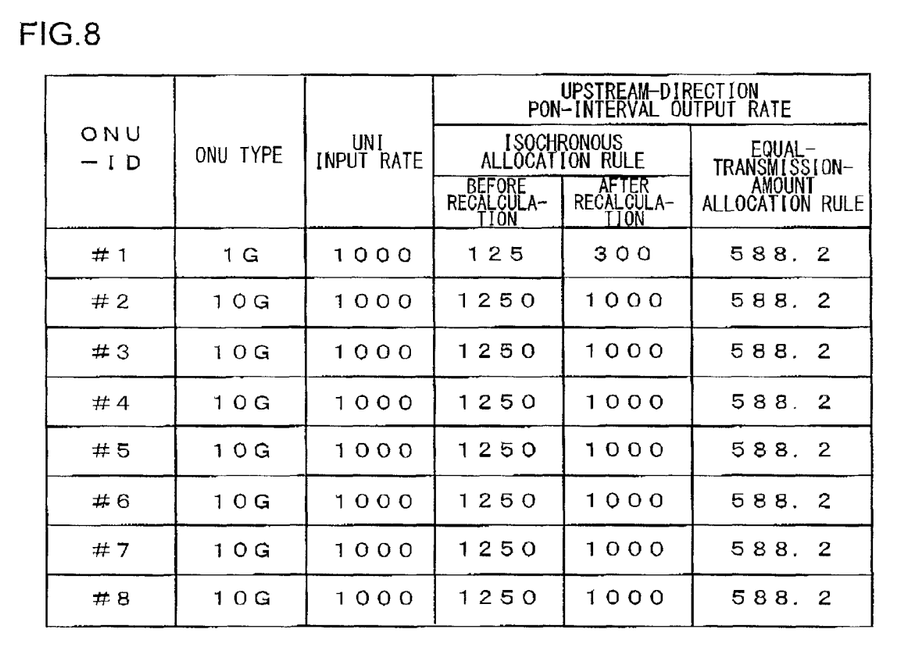
FIG. 8 is a diagram illustrating a third example of an upstream PON-interval output rate of an ONU.

FIG. 8 illustrates a third example of the upstream PON-interval output rates of ONUs. This example shows the upstream PON-interval output rates when the number of 1 G-ONUs 16 is much less than the number of 10 G-ONUs 18 in the PON system 100. The same as in the first example applies to the upstream PON-interval output rates, if no reallocation of the time slots occurs, when the isochronous allocation rule is applied. In the case the reallocation of the time slots is carried out, seven fourtieths ($7/40$) of the length of the grant cycle is additionally allocated to the time slots of the respective 1 G-ONUs 16. Thus, the upstream PON-interval output rate of the 1 G-ONUs 16 becomes larger than that of the second example. When the equal-transmission-amount allocation rule is applied, time slots accounting for ten seventeenths ($10/17$) of the length of the grant cycle are allocated to the respective 1 G-ONUs 16, and time slots accounting for one seventeenth ($1/17$) of the length of the grant cycle are allocated to the respective 10 G-ONUs 18.

According to the OLT 10 of the present embodiment, fairness in time allocation or fairness in throughput allocation can be ensured when performing dynamic bandwidth allocation on the 1 G-ONUs 16 and the 10 G-ONUs 18 that coexist in the same PON system. This allows for fairness among ONUs, that is, among subscribers, to be ensured even when the multiple ONUs having different maximum communication speeds are connected to one OLT due to the increase in speed of the data transmission in the access line area. In addition, fairness in time allocation or in throughput allocation can be ensured regardless of which allocation rule is selected. Thus, a subscribers' sense of unfairness can be more easily suppressed.

According to the OLT 10, the allocation rule of time slots can be appropriately switched at the discretion of the communication carrier. For example, an allocation rule can be determined based on the difference in fees between a 1 G connection service using a 1 G-ONU 16 and a 10 G connection service using a 10 G-ONU 18. When the difference in fees between the two services is small, the equal-transmission-amount allocation rule may be applied. This allows for a relatively large bandwidth for the 1 G-ONUs 16 to be ensured, and the subscribers of the 1 G connection service are thus not likely to feel inequity. On the other hand, when the difference in fees between the two services is large, the isochronous allocation rule may be applied. This allows for the efficient use of the communication speed of the 10 G-ONUs 18, allowing for improved user friendliness for the subscribers of the 10 G connection service.

Furthermore, according to the OLT 10, when the 10 G-ONU occupancy in the PON system 100 becomes large, the allocation rule is automatically switched from the equal-transmission-amount allocation rule to the isochronous allocation rule. This allows for an improved communication speed of the 10 G-ONUs 18, allowing for an improved level of user-friendliness for most of the subscribers. Furthermore, when the 10 G-ONU occupancy becomes small, the allocation rule is automatically switched from the isochronous allocation rule to the equal-transmission-amount allocation rule. This allows for the communication speed of the 1 G-ONUs 16 to be more likely ensured.

The above concept of switching an allocation rule is particularly effective when time slots to be allocated to respective ONUs are recalculated based on the speed limit of a UNI. This is because distributing, to 1 G-ONUs 16, the remaining portion of the time slots allocated to 10 G-ONUs 18 extends the lengths of the time slots to be allocated to the 1 G-ONUs 16, compensating for the decrease in the communication speed of the 1 G-ONUs 16, which is due to the switching of the allocation rule to the isochronous allocation rule. For example, with regard to the upstream PON-interval output rates based on the isochronous allocation rule in FIG. 8, all the values thereof after the reallocation exceed the values of the upstream PON-interval output rates based on the equal-transmission-amount allocation rule in FIG. 7. In other words, the switching of an allocation rule allows for a further improved level of user-friendliness for the subscribers of a 10 G-connection service without lowering the level of user-friendliness for the subscribers of a 1 G-connection service.

Described above is an explanation based on the embodiments of the present invention. These embodiments are intended to be illustrative only, and it will be obvious to those skilled in the art that various modifications to constituting elements and processes could be developed and that such modifications are also within the scope of the present invention.

Therefore, it will be obvious to those skilled in the art that the function to be achieved by each constituent requirement described in the claims may be achieved by each constituting element shown in the embodiments and in the modifications or by a combination of the constituting elements.

Explanation of Reference

10 OLT
16 1 G-ONU
18 10 G-ONU
20 UNI
30 optical receiver
32 reception buffer unit
34 data transmitter
36 data receiver
38 transmission buffer unit
40 optical transmitter
50 dynamic bandwidth allocation unit
52 home-side information storage unit
54 allocation request receiving unit
56 allocation execution unit
58 allocation result notification unit
60 instruction receiving unit
62 allocation rule switching unit
100 PON system Industrial Applicability The present invention can be used for a PON (Passive Optical Network) system.

The invention claimed is:

1. A station-side apparatus in a PON (Passive Optical Network) system comprising: an allocation request receiving unit operative to receive, from each of a plurality of home-side apparatuses, each adaptable for different maximum communication speeds, a bandwidth allocation request for data transmission in the upstream direction;
  an allocation execution unit operative to allocate, to each of the plurality of home-side apparatuses, a time slot for transmitting data from the home-side apparatus in a time-multiplexed manner, whose length is determined in accordance with any one of a plurality of types of allocation rules;
  an allocation result notification unit operative to notify each of the home-side apparatuses of information regarding an allocated time slot;
  and an allocation rule switching unit operative to switch a current allocation rule to another allocation rule when a predetermined switching condition is satisfied, wherein the plurality of types of allocation rules includes a first allocation rule by which a time slot of the same length is allocated to each of the home-side apparatuses and a second allocation rule by which a time slot, whose length is determined in accordance with the maximum communication speed of each of the home-side apparatuses so that the amount of data transmitted from each of the home-side apparatuses in a predetermined unit time becomes the same, is allocated to each of the home-side apparatuses.

2. The station-side apparatus according to claim 1, wherein the allocation rule switching unit switches an allocation rule to be observed by the allocation execution unit between the first allocation rule and the second allocation rule in accordance with the ratio of the home-side apparatuses that are adaptable for a maximum communication speed of at least a predetermined value to the plurality of home-side apparatuses.

3. The station-side apparatus according to claim 2, wherein the allocation rule switching unit switches an allocation rule to be observed by the allocation execution unit from the second allocation rule to the first allocation rule when the ratio of the plurality of home-side apparatuses that are adaptable for a maximum communication speed of at least a predetermined value becomes at least a predetermined value.

4. The station-side apparatus according to claim 2, wherein the allocation rule switching unit switches an allocation rule to be observed by the allocation execution unit from the first allocation rule to the second allocation rule when the ratio of the plurality of home-side apparatuses that are adaptable for a maximum communication speed of at least a predetermined value, becomes less than a predetermined value.

5. The station-side apparatus according to claim 1 further comprising: a home-side information storage unit operative to store the maximum communication speed at a UNI (User-Network Interface) in a subscriber's home in which each of the plurality of home-side apparatuses is installed, wherein the allocation execution unit redistributes, when the communication speed of a home-side apparatus that is estimated by a time slot allocated to the home-side apparatus exceeds the maximum communication speed at the UNI, a part of the time slot allocated to the home-side apparatus to another home-side apparatus.

6. A control method of a station-side apparatus in a PON (Passive Optical Network) system comprising: receiving, from each of a plurality of home-side apparatuses, each adaptable for different maximum communication speeds, a bandwidth allocation request for data transmission in the upstream direction;
   allocating, to each of the plurality of home-side apparatuses, a time slot for transmitting data from the home-side apparatus in a time-multiplexed manner, whose length is determined in accordance with any one of a plurality of types of allocation rules;
   notifying each of home-side apparatuses of information regarding an allocated time slot;
   and switching a current allocation rule to another allocation rule when a predetermined switching condition is satisfied;
   wherein the plurality of types of allocation rules includes a first allocation rule by which a time slot of the same length is allocated to each of the home-side apparatuses and a second allocation rule by which a time slot, whose length is determined in accordance with the maximum communication speed of each of the home-side apparatuses so that the amount of data transmitted from each of the home-side apparatuses in a predetermined unit time becomes the same, is allocated to each of the home-side apparatuses.

7. A PON (Passive Optical Network) system, wherein a plurality of home-side apparatuses, each adaptable for different maximum communication speeds, and a station-side apparatus are connected to each other, and wherein the station-side apparatus comprises: an allocation request receiving unit operative to receive, from each of the plurality of home-side apparatuses, a bandwidth allocation request for data transmission in the upstream direction;
   an allocation execution unit operative to allocate, to each of the plurality of home-side apparatuses, a time slot for transmitting data from the home-side apparatus in a time-multiplexed manner, whose length is determined in accordance with any one of a plurality of types of allocation rules;
   an allocation result notification unit operative to notify each of the home-side apparatuses of information regarding an allocated time slot;
   and an allocation rule switching unit operative to switch a current allocation rule to another allocation rule when a predetermined switching condition is satisfied; and
   wherein the plurality of types of allocation rules includes a first allocation rule by which a time slot of the same length is allocated to each of the home-side apparatuses and a second allocation rule by which a time slot, whose length is determined in accordance with the maximum communication speed of each of the home-side apparatuses so that the amount of data transmitted from each of the home-side apparatuses in a predetermined unit time becomes the same, is allocated to each of the home-side apparatuses.

\* \* \* \* \*